A. J. LEAR.
PEDAL HOLDER.
APPLICATION FILED MAR. 9, 1920.
1,350,228.
Patented Aug. 17, 1920.
2 SHEETS—SHEET 1.
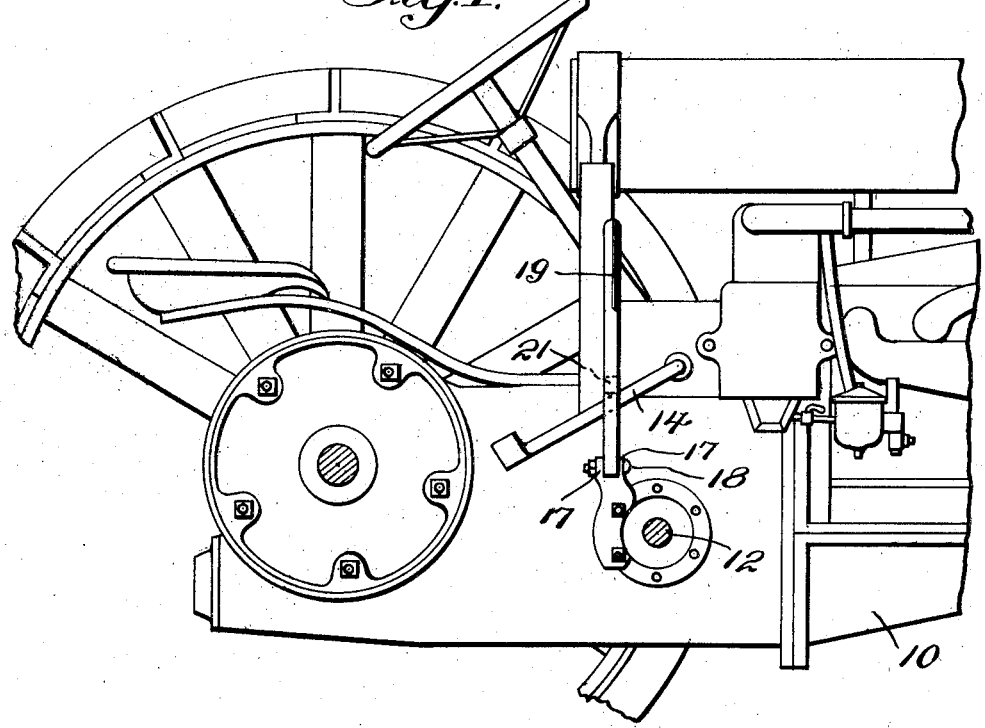
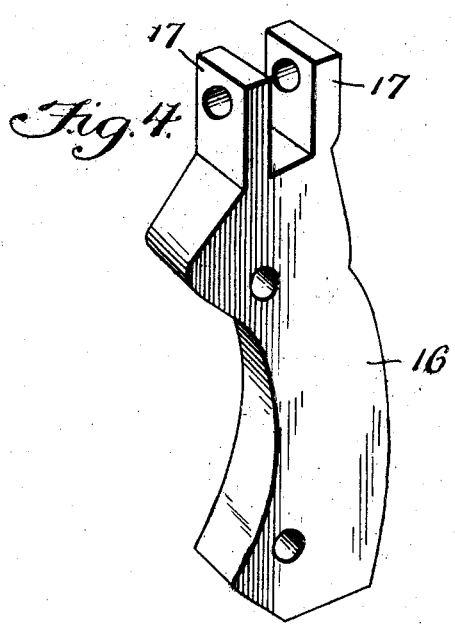
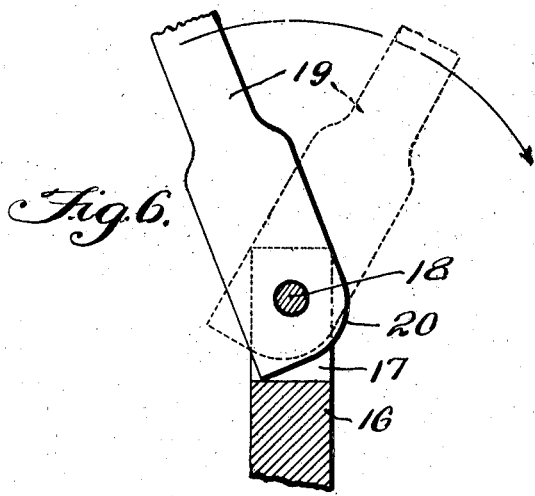
Archie J. Lear
INVENTOR
BY Victor J. Evans
ATTORNEY A. J. LEAR.
PEDAL HOLDER.
APPLICATION FILED MAR. 9, 1920.
1,350,228.
Patented Aug. 17, 1920.
2 SHEETS—SHEET 2.
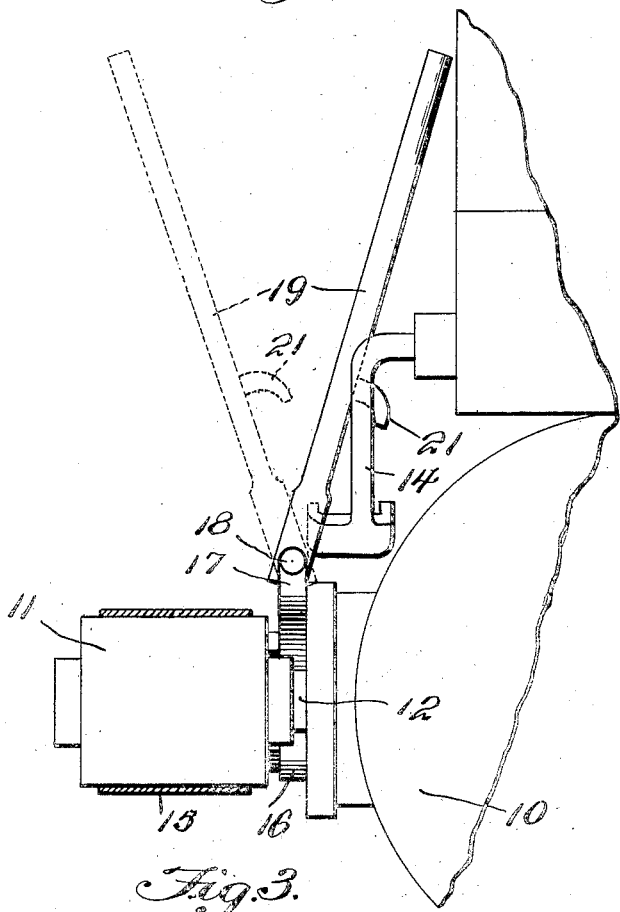
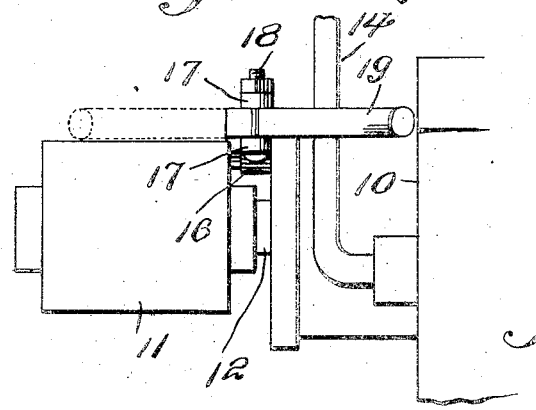
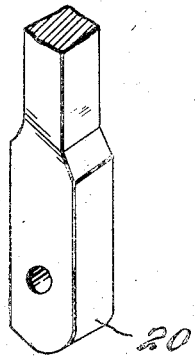

UNITED STATES PATENT OFFICE.

ARCHIE J. LEAR, OF RAGO, KANSAS.

PEDAL-HOLDER.

1,350,228.

Specification of Letters Patent.   Patented Aug. 17, 1920.

Application filed March 9, 1920. Serial No. 364,577.

*To all whom it may concern:*

Be it known that I, ARCHIE J. LEAR, a citizen of the United States, residing at Rago, in the county of Kingman and State of Kansas, have invented new and useful Improvements in Pedal-Holders, of which the following is a specification.

In the tractor manufactured by the Ford Automobile Company, known as the Fordson, a belt pulley is arranged at one side thereof. The shaft of this pulley is controlled by a clutch which is operated by a foot pedal. The shaft revolves until pressure is applied to the pedal to release the clutch. It is frequently necessary to stop the belt of the pulley which is connected with a machine or other mechanism that is operated thereby, and as long as such mechanism is halted pressure must be retained on the pedal. The result is that one man must remain in the tractor with his foot on the pedal as long as the driven mechanism is to remain idle, as the removal of pressure from the pedal might result in serious injury to attendants of the driven mechanism. Therefore, I propose to produce a simple means for holding the pedal in clutch releasing position which may be readily applied without interfering with any of the parts of the tractor, which may be easily operated for locking the lever in clutch releasing position, and which shall be positive in such operation.

I attain my objects by a construction, combination and operative arrangement of parts, a satisfactory embodiment of which is shown in the accompanying drawings.

In the drawings:—

Figure 1 is a side elevation of a tractor looking toward the belt pulley thereon, and showing the improvement in operative position.

Fig. 2 is a fragmentary elevation looking toward the clutch and belt pulley, the belt for the latter being in section, the view illustrating in full lines the lever swung to locking position with respect to the pedal, and in dotted lines out of such position.

Fig. 3 is a plan view of the construction disclosed in Fig. 2.

Fig. 4 is a perspective view of the fixed member of the improvement.

Fig. 5 is a perspective view of the movable lever member of the improvement.

Fig. 6 is a detail sectional view illustrating the manner in which the lever is limited in swinging in one direction on the fixed member of the improvement, and showing in dotted lines the position of the lever when in pedal engaging position, the arrow illustrating the direction of swinging of the lever.

Referring now to the drawings, the numeral 10 designates a Fordson tractor which has arranged at one side thereof a belt pulley 11. The shaft 12 of the pulley is associated with clutch mechanism. As the clutch mechanism is of the common or ordinary construction and does not form part of the subject matter of this invention, a detailed description thereof is not deemed necessary. It is thought sufficient to state that the clutch elements are normally in engagement so that the shaft 12 is revolved as long as the engine of the tractor is in motion and that the clutch elements are brought out of engagement by the usual pedal 14. The pedal is controlled by the foot of the driver and is spring influenced so that when pressure thereon is relieved the clutch elements will be associated and the shaft rotated.

The pulley 11 is designed to have therearound a belt 15 which is connected to some suitable machine or mechanism to be driven by the tractor, said mechanism not being illustrated.

On the outer face of the clutch case I bolt or otherwise secure the fixed member 16 of my improvement. This member is preferably in the nature of a plate or casting, having an inner concaved edge which contacts with the side of the cylindrical clutch casing and which is provided with a straight extension that is bifurcated at its outer end to provide spaced arms 17. Between these arms there is pivoted, as at 18 the movable member or lever 19 of my improvement. The lever has its end received between the arms 17 rounded at one of its corners as indicated by the numeral 20. By this arrangement the lever can swing beyond the vertical in one direction only, and that in a direction toward the pedal 14. The pivot 18 is preferably in the nature of a removable element, so that when my attachment is not desired for use in locking the pedal 14, the removable member or lever 19 thereof may be detached from the fixed member.

On the lever 19 there is a curved finger 21. This finger is so positioned that the same will engage with the pedal 14 when the latter is in its depressed and clutch releasing position. This engagement between the lever and the pedal holds the pedal against the influence of its spring and retains the same in clutch releasing position.

It is believed that the simplicity of my construction and the advantages thereof will be perfectly apparent to those skilled in the art to which such inventions relate.

It is to be further understood that the drawings and description relate to one form of my invention and that such changes may be made therefrom as fall within the scope of what is claimed.

Having thus described the invention, what I claim is:—

In a tractor, the combination with a motor driven shaft, clutch means between the motor and shaft, and a pedal for operating said clutch to release the shaft from the motor, of a plate secured to the clutch casing and having a bifurcated upper end, a lever having one end thereof received in the bifurcated end of the plate, a removable pivot connecting the lever to the plate, means on the lever engaging with the plate for sustaining the same against swinging beyond the vertical in one direction only, and a curved finger on the lever arranged to engage with the pedal for locking the same in clutch releasing position.

In testimony whereof I affix my signature.

ARCHIE J. LEAR.